UNITED STATES PATENT OFFICE.

SAMUEL CABOT, OF CANTON, MASSACHUSETTS, ASSIGNOR TO SAMUEL CABOT, INC., OF BOSTON, MASSACHUSETTS, A CORPORATION OF MASSACHUSETTS.

COATING COMPOSITION.

1,308,575.  Specification of Letters Patent.  Patented July 1, 1919.

No Drawing.   Application filed September 18, 1916.  Serial No. 120,811.

*To all whom it may concern:*

Be it known that I, SAMUEL CABOT, a citizen of the United States, residing at Canton, county of Norfolk, Commonwealth of Massachusetts, have invented certain new and useful Improvements in Coating Composition, of which the following is a specification.

The subject matter of my present invention is a novel product of individual character. This product results from a method of chlorinating certain non-crystalline liquid hydrocarbons or mixtures of them and is at present at least found to be especially adapted to be used as a paint or as a body in a paint or varnish. The substance is transparent and light colored and is produced as a viscous or solid mass capable of solution in coal tar naphtha in all proportions. It possesses a non-combustible or fire proof feature on account of its high state of chlorination and is commercially of great practical value as a coating body.

I am aware that crystalline, waxy or tarry products have been secured by chlorinating certain coal tar products, but these waxy or tarry substances have not been suitable for use as a paint or varnish. This is because these substances have been of a nature incapable of suitable spreading and lacking solubility, toughness or transparency or have been dark and unsuited for use either alone or in mixture with any of the lighter pigments.

My product on the other hand is of a light color and substantially free from any dark colored polymerization or decomposition products, is soluble in coal tar naphtha in all proportions, forms a tough coating when spread thin on a surface and is transparent so that it is capable of producing lighter shades while at the same time being exceedingly rich in chlorin and highly resistent to combustion.

A characteristic form of my product is a light amber colored material which is practically insoluble in water, but readily soluble in benzol or coal tar naphtha. A characteristic form of my substance is produced from the non-crystalline parts of aromatic hydrocarbon, as for example, creosote oil from which the naphthalene has been crystallized as by refrigeration. As is well known the chlorination of a hydrocarbon produces a violent reaction and excessive heat and in producing some products this heat is conserved and even augmented to hasten complete chlorination. I have discovered that in order to produce my novel substance, however, complete chlorination must be effected without generation of excessive heat which would effect polymerization or decomposition, and I find that this characteristic product is produced by a slow progressive chlorin substitution of the hydrogen atoms of the non-crystalline hydrocarbon. The method of producing this characteristic substance is the subject matter of an application filed by me, June 5, 1914, Serial No. 843,303, and entitled Process of chlorinating hydrocarbons.

As an example of a commercial product characteristic of my invention I give the following: ten parts by weight of non-crystallized water gas tar distillate, as for example, creosote oil refrigerated to crystallize the naphthalene anthracene or other crystalline or wax like bodies, highly chlorinated at a temperature below the point of polymerization or decomposition to effect a gradual progressive chlorin substitution of the hydrogen atoms. At this stage the product is a viscous mass which hardens upon exposure to the air. If, as is usually the case, a liquid form is required 10 parts are thinned with 14 parts of coal tar naphtha to which may be added a suitable amount of high boiling creosote oil. In case a dark or black coating is desired pitch from coal tar, water gas tar or any asphaltum may be added in place of the creosote oil. This forms the vehicle in which may be ground 16 parts more or less of any suitable pigment even one of light color. The result is a product which forms a coating such as a paint which is substantially non-combustible and fire resistent.

In the practice of my invention various modifications may be had in the relative proportioning of the quantities of pigment or thinning substance, and may be somewhat varied. The chief characteristic property of such a product in accordance with my invention is the highly chlorinated non-crystalline hydrocarbon product of characteristic light color and free from dark polymerization or decomposition products on which account it may be associated with a light pigment with a resultant non-combustible characteristic for the whole.

What I therefore claim and desire to secure by Letters Patent is:—

1. A light colored, substantially non-combustible coating composition, incapable of distillation without partial decomposition, containing chlorinated, non-crystalline hydrocarbon products, containing a plurality of chlorin atoms, substantially free from polymerization or decomposition products.

2. A light colored, substantially non-combustible coating composition, consisting of a highly chlorinated non-crystalline hydrocarbon product substantially free from polymerization or decomposition products, and a pigment.

3. A light colored and transparent novel product of hydrocarbon chlorinizations, soluble in an organic solvent, free from appreciable amounts of dark colored polymerization and decomposition products and being at least partially incapable of being volatilized without decomposition.

4. A transparent and light colored coating product of hydrocarbon chlorinizations, soluble in an organic solvent free from dark colored polymerization and decomposition products, and a volatile solvent.

5. A substantially non-combustible coating composition consisting of a highly chlorinated non-crystalline hydrocarbon product, a volatile solvent and an extender soluble in it and non-volatile at ordinary temperatures.

6. A light colored, transparent coating composition, comprising a novel product, or hydrocarbon chlorinizations soluble in an organic solvent, free from dark colored polymerization and decomposition products, a volatile solvent and an extender consisting of aromatic products non-volatile at ordinary temperatures.

7. A paint comprising a light colored and transparent product of hydrocarbon chlorinizations, soluble in an aromatic solvent, free from dark colored polymerization and decomposition products, a volatile solvent, and high boiling creosote oil and a pigment.

8. A paint comprising a novel, light colored and transparent product, soluble in an aromatic solvent, free from dark colored polymerization and decomposition products, a volatile solvent and a pigment.

9. A substantially non-combustible coating composition consisting of a highly chlorinated, non-crystalline hydrocarbon product, a volatile solvent and an extender comprising aromatic products non-volatile at ordinary temperatures.

In testimony whereof I affix my signature in presence of two witnesses.

SAMUEL CABOT.

Witnesses:
 HORACE D. BRADFORD,
 WILLIAM L. HAEFFNER.